No. 781,910. PATENTED FEB. 7, 1905.
A. L. SAUER.
SKIM MILK AND WHEY WEIGHING SCALE.
APPLICATION FILED JUNE 27, 1904.

3 SHEETS—SHEET 1.

WITNESSES:
J. A. Jamison.
C. M. Albee.

INVENTOR
Adelbert L. Sauer
BY G. H. Albee,
ATTORNEY

No. 781,910. PATENTED FEB. 7, 1905.
A. L. SAUER.
SKIM MILK AND WHEY WEIGHING SCALE.
APPLICATION FILED JUNE 27, 1904.

WITNESSES:
J. A. Jamison
E. M. Albee.

INVENTOR
Adelbert L. Sauer.
BY
G. H. Albee.
ATTORNEY

No. 781,910. PATENTED FEB. 7, 1905.
A. L. SAUER.
SKIM MILK AND WHEY WEIGHING SCALE.
APPLICATION FILED JUNE 27, 1904.
3 SHEETS—SHEET 3.
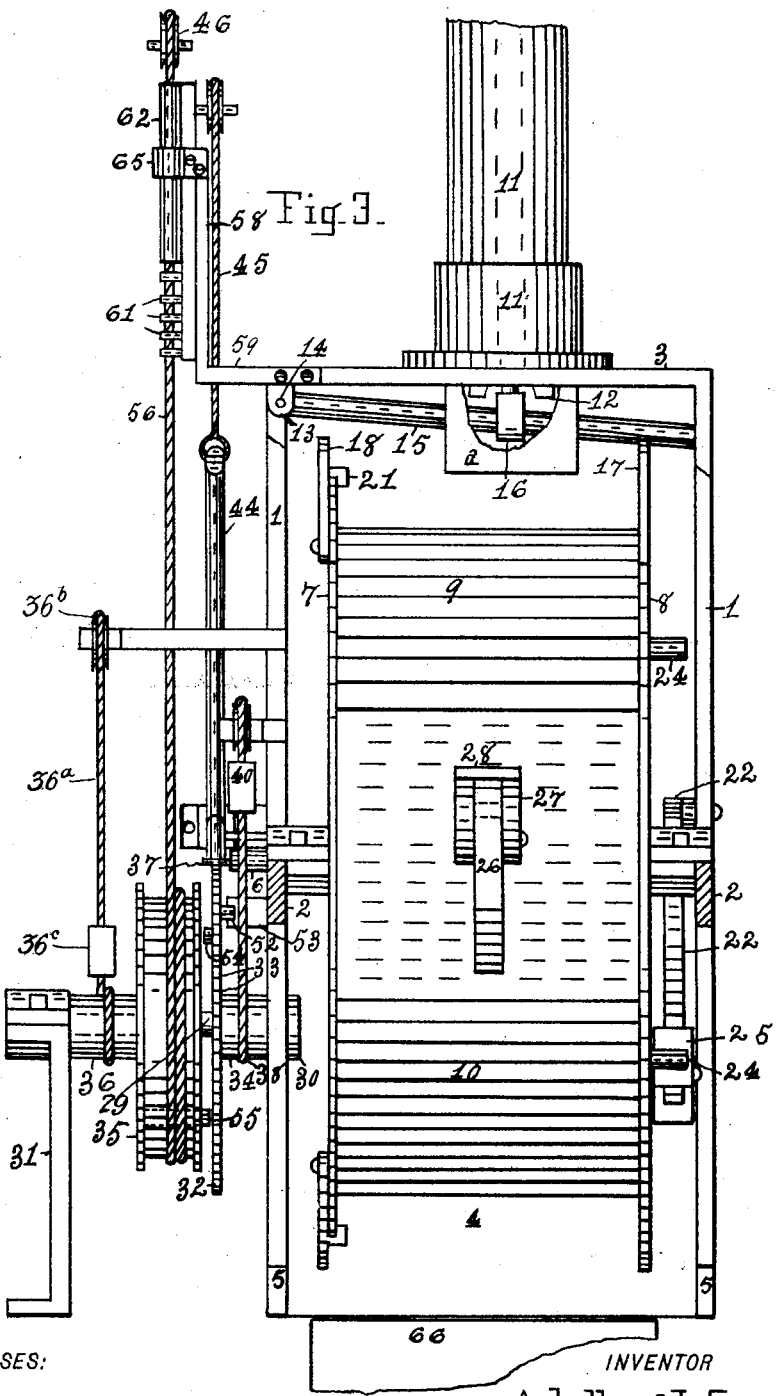
WITNESSES:
J. A. Jamison.
C. M. Albee.
INVENTOR
Adelbert L. Sauer
BY G. H. Albee.
ATTORNEY No. 781,910.

Patented February 7, 1905.

UNITED STATES PATENT OFFICE.

ADELBERT L. SAUER, OF MILWAUKEE, WISCONSIN.

SKIM-MILK AND WHEY WEIGHING SCALE.

SPECIFICATION forming part of Letters Patent No. 781,910, dated February 7, 1905.

Application filed June 27, 1904. Serial No. 214,243.

*To all whom it may concern:*

Be it known that I, ADELBERT L. SAUER, a citizen of the United States, and a resident of Milwaukee, in the county of Milwaukee and State of Wisconsin, have invented a new and useful Improvement in Skim-Milk and Whey Weighing Scales, of which the following is a specification.

My invention relates to a weighing device in which the liquid to be weighed is received by a revolving wheel having buckets, which when one is filled with a certain determined amount or weight of said liquid will cause said wheel to revolve a partial revolution and empty said bucket while another one is brought into proper position for being filled, mechanism being arranged for operation by the revolutions of said wheel, which when set by the operator at any desired amount of weight will permit the wheel to revolve the required number of times and then stop its revolutions and cease the delivery of liquid; and its object is to provide a weighing-scale for butter and cheese factories which is easily operated, will deliver approximately correct weights of such liquid as the persons which supply said factories with milk desire to have returned to them for feeding purposes, and which scale can be placed where it is convenient for receiving the liquid by the patrons of the factory, while its weight-determining mechanism can be placed entirely under the control of the factory operator, said device being illustrated in the accompanying drawings, in which—

Figure 1:
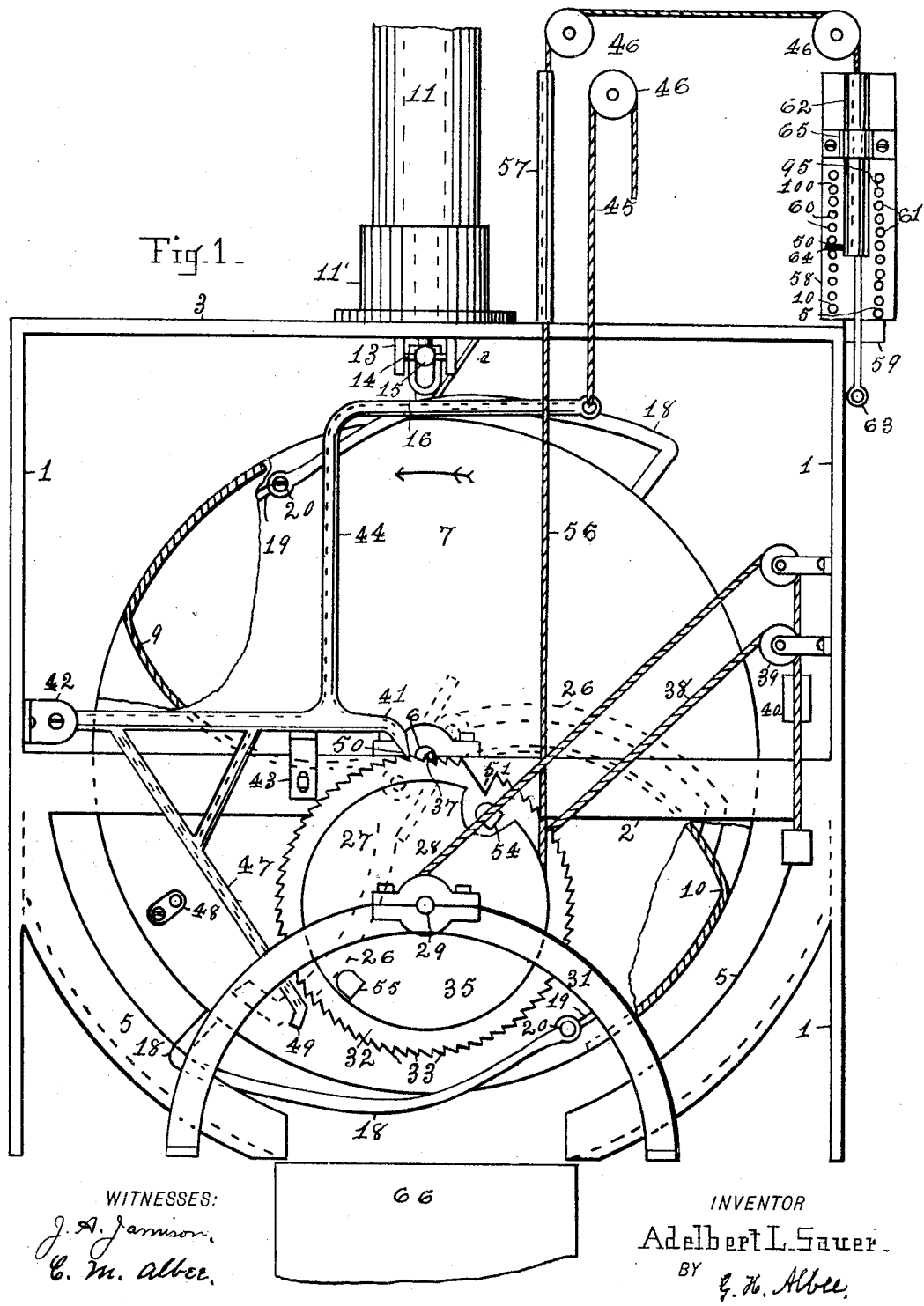
Figure 2:
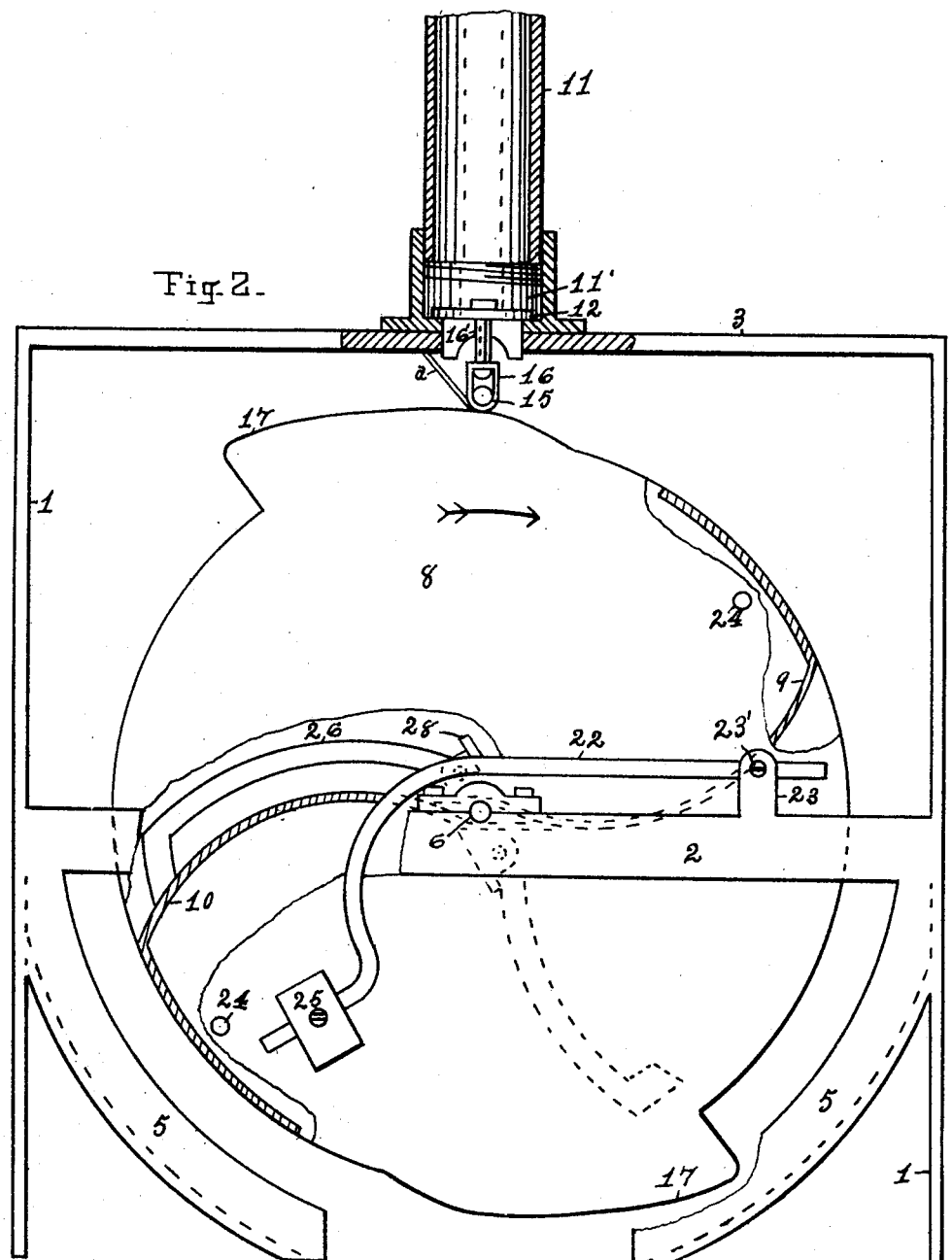

Figure 1 is an end elevation of that end of the wheel having the larger part of the mechanism for determining the weight of the liquid which is to be delivered. Fig. 2 is an end elevation of the opposite end of the wheel and its mechanism upon that end. Fig. 3 is a side elevation longitudinally of the axis of the wheel and showing the mechanism thereof, the framing upon the right-hand side in Fig. 1 being removed, Similar numerals and letters indicate like parts in the several views.

The frame of the machine consists of posts 1, cross-girths 2, cover 3, and curved front and rear side pieces or chutes 4 for conveying liquid from the wheel to the milk-can underneath the machine, the chutes having side flanges 5, the two latter parts being removed in front in Fig. 3 for showing the wheel entire. The wheel is mounted for revolution upon and with the shaft 6 and consists of end disks 7 and 8, having two buckets 9 and 10 formed between them, the buckets being similar in form, adapted to hold a quantity of liquid to be weighed, and entirely emptied of it as the wheel is revolved. Mounted upon the frame-cover 3 is a pipe 11, which is to be connected at its upper end with a supply of liquid to be delivered. A valve 12 is arranged at the lower end of said pipe in the valve-chamber 11', through which the liquid can be delivered into the buckets 9 and 10, a guiding-chute $a$ being arranged for directing the liquid into the buckets. Hinged in the hanging bracket 13 upon the pin 14 is a rod 15, which extends over the wheel and is connected by the band 16 and the bolt 16' with the valve. Upon the end disks of the wheel are cams 17 and 18, the former being shown as integral with the disk and the latter as adjustable circumferentially of the disk by means of the slots 19 and screw 20. A lip 21 extends out from the cam and rests on the outer edge of the disk. The purpose of the adjustable cam is to lengthen or shorten the time in which the milk will be allowed to run before the valve will close, the position of the cam upon the disk being adjustable circumferentially of the disk along the slot 19. These cams as the wheel revolves engage the rod 15, lift it, and also the valve. One of the cams may be arranged in position for opening the valve and the other for closing it at the proper time for allowing the desired weight of liquid to enter the buckets of the wheel. The valve which is shown in Fig. 2 is the common cistern-pump valve; but other styles of valves may be arranged for admitting the liquid to the buckets. The cams are shown in position for commencing the opening of the valve. The wheel will revolve in the direction of the arrows, filling and emptying the buckets one after the other as long as a supply of liquid is provided unless its revolutions are stopped by some means.

The weighing of the liquid so that an equal amount is delivered to each bucket is provided for by means of a lever 22, which is arranged to swing freely upon pin 23' in the bracket-arm 23. Pins 24 project out from the side of the disk 8 for engaging the short arm of the lever, which they will do whenever sufficient liquid is admitted to a bucket, and the wheel will be revolved until a pin strikes the short arm of the lever. As the weight of liquid increases the wheel will revolve until the pin slides off of the short arm of the lever and the liquid is discharged from the wheel. A weight 25 is adjustably secured upon the long arm of the lever for allowing the desired weight of liquid to enter each bucket before said weight will rise sufficiently to allow the pin 24 to slide off of the short arm of the lever and the liquid to be discharged from the bucket. As one bucket is emptied another one is brought into position for receiving liquid.

For assisting in making the revolutions of the wheel continuous and of even speed a governor-lever 26 is hinged within each bucket to a suitable socket, as 27, each socket having a stop 28 for preventing its lever from swinging backward beyond a determined point, said levers being intended to swing outward, as the left-hand one in Fig. 1, and inward, as the right-hand one is shown to be, at just the right time in the revolutions of the wheel for assisting in bringing the buckets into the proper position for receiving the liquid and discharging the same and making the speed of its revolutions nearly uniform.

For the purpose of delivering a certain weight of liquid to a customer one end of a shaft 29 is fixed in the boss 30 of the frame and its other end in a standard 31, having mounted loosely thereon the ratchet-wheel 32, having teeth 33, and integral with said wheel a drum 34, and also having the rope-pulley 35, with a drum 36 integral with it. The purpose of the drum 34, by means of the rope 38, sheave-pulley 39, and weight 40, is when the pawl is not engaged with the teeth 33 to revolve the ratchet-wheel in the direction of the arrow in Fig. 1 until stopped by some means, and the purpose of the rope 36ª, pulley 36ᵇ, and weight 36ᶜ is to return the rope-pulley 35 to its normal position when moved from it. The end of the shaft 6 is provided with a crank-pin 37, which in the revolutions of said shaft engages one of the teeth 33 and revolves the ratchet-wheel at each revolution of said shaft the distance of one tooth to the adjoining one. A pawl 41, which is hinged in the bracket-arm 42, engages with the teeth 33 and holds the wheel from backward movement. An adjustable stop 43 is arranged for arresting the downward movement of the pawl below the required point. The pawl is provided with an arm 44, from the outer end of which a rope 45, which runs over the sheave-pulley 46, is arranged, which upon the pulling of its free end by the operator the pawl can be released from the teeth 33. Below the pawl an arm 47 extends downward at an angle for engaging the stop-arm 48, which extends out from the wheel-disk 7, the arm 47 being provided with a hook 49 for engaging with the stop-arm 48 whenever the dog 50 of the pawl 41 falls into the notch 51 in the outer edge of the ratchet-wheel, which it can do whenever the stop 43 is lowered from the position in which it is shown for allowing it to do so. The purpose of said arm, hook, and notch is for stopping the revolution of the wheel at the point desired for arranging the quantity-delivering mechanism for each customer.

Upon the inner side of the ratchet-wheel is a pin 52, arranged in position for engaging the arm 53, which extends outward from the girth 2 of the frame, the ratchet-wheel being turned backward until the pin engages the arm at the commencement of weighing each customer's liquid which is to be returned to him. Upon the side of the ratchet-wheel adjoining the rope-pulley 35 is fixed a stop-pin 54, and in its path, as the ratchet-wheel is revolved toward the right, a similar stop-pin 55 is secured upon the rope-pulley 35. These two stop-pins are shown for the purpose of describing their working accurately, with each having one flat side, which when no weight is shown by the weight-indicating mechanism are normally in contact. The pin is shown upon the outer side of the rope-pulley, but extends through said pulley and projects so as to be engaged by the similar pin in the ratchet-wheel. In practice this pin need not appear upon the outside of the rope-pulley, as it has no function there, but for showing its position with reference to the pin 54 is so shown in the drawings. A rope or connection of some inelastic material, as 56, is secured at one end to the rope-pulley, and its other end is carried upward and away from the machine. In actual use the connection may be protected, as by the pipe 57, so that it is inaccessible by any but one of the factory operatives, so that those to whom the liquid is to be delivered cannot tamper with the weight-indicating mechanism at the outer end of said connection. This indicating mechanism consists of a weight-indicating board 58, secured in a suitable position within the factory, (for showing its operation in the present case it is attached to an arm 59, which is secured to the frame of the machine,) where it is not accessible by those to whom the liquid is to be delivered. The scale-board is in the present case provided with two vertical rows of pins 60 and 61, spaced apart equally and forming spaces between them, their distance apart bearing some exact ratio to the distance from one tooth to the other of the ratchet-wheel. The pins upon one row are arranged a half-space higher than those of the other row, and one row may be numbered "5," "15," "25," "35," &c., and those of the other row "10," "20," "30," "40," "50," &c., up to a hundred. A round bar 62 is fitted to slide vertically between the two rows, its upper end being connected to the connection 56 and its lower end being supplied with a handle 63, and intermediate its ends a pin 64 is provided, which is adapted to fit in between the pins 60 or 61. A band 65, which is secured to the board 58, encircles the bar 62, so that by grasping the handle the operator can move the bar up or down or turn the pin 64 in between the pins of either row.

The buckets of the wheel are each intended to receive and deliver two and one-half pounds of liquid, (wheels of any other capacity may be made and be operated in a manner similar to that herein shown,) the two buckets holding five pounds, which will be delivered at each revolution of the wheel, while the pin 37 will revolve the ratchet-wheel one tooth. The operator wishing to deliver to a customer, say, two hundred and fifty pounds of liquid, releases the pawl from the teeth 33, when the weight upon the rope of the drum 34 will revolve the ratchet-wheel backward until the stop-pin 52 strikes against the stop-arm 53, this starting-point mechanism being used in the present case instead of the notch 51, the stop-pin 54 being located upon the ratchet-wheel in its correct position relative to the weight-indicating numerals upon the board 58. He then arranges the pin 64 in the space marked "50" on the scale-board, which action will turn the rope-pulley 35 until the stop-pin upon the rope-pulley is distant from the stop-pin 54 upon the ratchet-wheel fifty teeth of said wheel. Multiplying the fifty by five will give two hundred and fifty pounds of liquid delivered. The stop-pin 54 having now engaged the stop-pin 55, the rope or connection from the rope-pulley to the bar 62 will hold the rope-pulley and ratchet-wheel from turning, and consequently the revolutions of the liquid-containing wheel will stop and the delivery of liquid cease until the mechanism is again arranged for another delivery.

66 indicates a milk-can into which the curved sides or chutes 4 direct the liquid as the buckets are emptied.

Having described my invention, what I claim, and desire to secure by Letters Patent, is—

1. In a device of the character described, a wheel mounted upon a shaft for revolution in a suitable frame and being provided with buckets adapted to receive liquid from a suitable supply which will cause said wheel to revolve a partial revolution and to discharge the liquid as the wheel is revolved, a valve arranged above said wheel for admitting said supply, cams upon said wheel arranged for opening and allowing the closing of said valve at determined points in the revolutions of said wheel, and a weighted lever and a stop-pin for being engaged by said lever arranged for being tilted as the stop-pin outside of each bucket of the wheel engages with the short arm of said lever and thereby allows an equal weight of liquid to enter each bucket before the same is discharged, substantially as described.

2. In a device of the character described, a wheel mounted upon a shaft for revolution in a suitable frame and being provided with buckets adapted to receive liquid from a suitable supply which will cause said wheel to revolve a partial revolution and to discharge the liquid as the wheel is revolved, a valve arranged above said wheel for admitting a supply of liquid to said buckets, a rod arranged longitudinally of and above said wheel-shaft, one end thereof being hinged for a vertical movement of its other end and intermediate its ends being connected with said valve so as to open and permit the closing of said valve by the upward and downward movement of said rod, and cams arranged upon said wheel for engaging said rod and thereby opening and allowing the closing of said valve as the wheel is revolved, substantially as set forth.

3. In a device of the character described, a wheel mounted upon a shaft for revolution in a suitable frame and being provided with buckets adapted to receive liquid from a suitable supply which will cause said wheel to revolve a partial revolution and to discharge the liquid as the wheel is revolved, a valve arranged above said wheel for admitting a supply of liquid to said buckets, a rod arranged longitudinally of and above said wheel-shaft, one end thereof being hinged for a vertical movement of its other end and intermediate its ends being connected with said valve so as to open and close said valve by the upward and downward movement of said rod, and cams arranged upon said wheel for controlling the movements of said rod as the wheel is revolved, one of said cams being adjustable circumferentially of said wheel for governing the length of time in the revolution of said wheel in which the valve is open, substantially as described.

4. In a device of the character described, a wheel mounted upon a shaft for revolution in a suitable frame and being provided with buckets adapted to receive liquid from a suitable supply which will cause said wheel to revolve a partial revolution and to discharge the liquid as the wheel is revolved, a valve arranged above said wheel for admitting said supply, cams upon said wheel arranged for opening and allowing the closing of said valve at determined points in the revolutions of said wheel, a stop-pin and a weighted lever arranged the lever for being tilted as the aforesaid stop-pin outside of each bucket of the wheel engages with the short arm of said lever and thereby allows an equal weight of liquid to enter each bucket before the same is discharged, and mechanism for starting the revolutions of said wheel and for stopping the same at the desired number of revolutions, substantially as set forth.

5. In a device of the character described, a wheel mounted upon a shaft for revolution in suitable framing and being provided with buckets adapted to receive liquid from a suitable supply which will cause said wheel to revolve a partial revolution and to discharge the liquid as the wheel is revolved, a valve arranged above said wheel for admitting said supply, cams upon said wheel arranged for opening and allowing the closing of said valve at determined points in the revolutions of said wheel, a stop-pin, and a weighted lever arranged the lever for being tilted as the aforesaid stop-pin outside of each bucket of the wheel engages with the short arm of said lever and thereby allows an equal weight of liquid to enter each bucket before the same is discharged, and mechanism for starting the revolutions of said wheel and for stopping the same at the desired number of revolutions, consisting of a crank-pin in one end of said wheel-shaft, a ratchet-wheel having a rope-drum integral therewith mounted for revolution loosely upon a shaft in a suitable position for its teeth to be engaged by said crank-pin and being provided with a stop-pin upon its inner side a stop-arm arranged upon the frame of the machine for being engaged by said stop-pin, a pawl arranged for engaging the teeth of said ratchet-wheel, a weighted rope arranged around said drum for normally holding said stop-pin against said stop-arm whenever said pawl is released from engagement with the teeth of said ratchet-wheel, a stop-pin arranged upon the outer side of said ratchet-wheel, a rope-pulley having a rope-drum integral with said rope-pulley mounted loosely on the shaft of said ratchet-wheel, a stop-pin on said rope-pulley arranged in position for being engaged by the stop-pin upon the outer side of said ratchet-wheel, a weighted rope around the drum of said rope-pulley arranged for normally holding the flat faces of the stop-pins, upon the adjoining ends of the ratchet-wheel and rope-pulley out of contact with each other, a weight-indicating board arranged in a suitable position at a distance from said rope-pulley having two rows of pins having spaces between them bearing a certain ratio to the distance of one tooth to its adjoining one of said ratchet-wheel, a bar provided with a pin arranged to be turned into each of the spaces between either of said rows of pins, a flexible and inelastic connection between one end of said bar and the rope-pulley aforesaid, and a handle to said bar for turning said pin of the bar into a space between the pins of either of said two rows, substantially as described.

6. In a device of the character described, comprising a wheel having buckets therein, mounted for revolution in a suitable frame, said buckets being adapted to receive from a suitable supply a quantity of liquid and to discharge the same as the wheel revolves, a governing-weight arranged near the center of the wheel in each of said buckets so as to fall outward by gravity as the wheel revolves, and a stop arranged for preventing said weight from falling outward beyond a determined point and thereby assisting in making the revolutions of the wheel continuous and its speed uniform, substantially as set forth.

ADELBERT L. SAUER.

Witnesses:
W. G. BROWN,
S. B. MORGAN.